(12) United States Patent
Yoshida

(10) Patent No.: US 6,546,020 B1
(45) Date of Patent: *Apr. 8, 2003

(54) DATA COMMUNICATION SYSTEM

(75) Inventor: Takehiro Yoshida, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,275

(22) Filed: Sep. 9, 1998

(30) Foreign Application Priority Data

Sep. 10, 1997 (JP) .............................................. 9-262871

(51) Int. Cl.[7] .................................................. H04N 1/32
(52) U.S. Cl. ...................... 370/449; 358/436; 358/438; 358/439
(58) Field of Search ................................ 358/435, 436, 358/438, 439; 370/449

(56) References Cited

U.S. PATENT DOCUMENTS

| | | | | |
|---|---|---|---|---|
| 5,418,624 A | | 5/1995 | Ahmed | 358/435 |
| 5,671,270 A | | 9/1997 | Yoshida | 379/100 |
| 5,748,714 A | | 5/1998 | Yoshida | 379/100 |
| 6,072,597 A | * | 6/2000 | Yoshida | 358/435 |
| 6,104,504 A | * | 8/2000 | Imai et al. | 358/400 |
| 6,281,987 B1 | * | 8/2001 | Yoshida | 358/434 |
| 6,414,965 B1 | * | 7/2002 | Yoshida | 370/449 |

FOREIGN PATENT DOCUMENTS

| | | | |
|---|---|---|---|
| EP | 0 637 164 A2 | 2/1995 | |
| EP | 0 652 668 A2 | 5/1995 | |
| EP | 0 674 424 A2 | 9/1995 | |
| EP | 902584 A2 | * | 3/1999 |

OTHER PUBLICATIONS

International Telecommunication Union: "ITU–T. Rec. T.30 Amendment 3, Terminals for Telematic Services", ITU–T Telecommunication Standardization Sector of ITU, Jun. 1998.

International Telecommunication Union: "ITU–T. Rec. T. 30 Amendment 1: Terminals for Telematic Services:", ITU–T Telecommunication Standardization Sector of ITU, Jul. 1997.

International Telecommunication Union: "ITU–T Rec. T.30", ITU–T Telecommunication Standardization Sector of ITU, Jul. 1996.

US Patent Application Ser. No. 09/172,059 filed Oct. 14, 1998.*

* cited by examiner

*Primary Examiner*—Melvin Marcelo
(74) *Attorney, Agent, or Firm*—Fitzpatrick, Cella, Harper & Scinto

(57) ABSTRACT

There is provided a data communication system capable of effectively executing multi-polling communication.

In case of multi-polling communication between a polling-transmitter and a polling-receiver, the polling-transmitter declares the presence or absence of the multi-polling transmission function by a DIS signal, and the polling-receiver informs, by a DTC signal, whether polling reception of different information is requested in succession to the previously designated information. In response, the polling-transmitter is adapted, after the transmission of a document designated by a SEP signal, to transmit an EOS signal in case the polling reception of different information is requested, but to transmit an EOP signal in case such polling reception of different information is not requested.

18 Claims, 12 Drawing Sheets

DATA COMMUNICATION SYSTEM

BACKGROUND OF THE INVENTION

1. Field of the Invention

The present invention relates to a data communication system, such as a facsimile system, capable of multi-polling communication between a polling transmitter and a polling receiver.

2. Related Background Art

Multi-polling communication is presently proposed by ITU-T, and an example of the protocol therefor is shown in FIG. 12. As shown in FIG. 12, a DIS signal contains a signal (ms bit) indicating the presence or absence of the multi-selection function, and, if the signal is "1" indicating the presence of the multi-selection function, a polling-receiver sets the ms bit of a DTC signal at "1" when it requests the multi-polling.

On the other hand, a polling-transmitter transmits an EOS (end-of-selection) signal after the transmission of a document, and the polling-receiver transmits a DTC signal in case of requesting a next document or a MCF signal in case of not requesting the next document.

In the above-explained configuration, however, in case of conducting the next polling reception, the polling-receiver is incapable of informing the polling-transmitter that the document has been correctly received. Also, training operations cannot be effectively selected since RTN and RTP signals cannot be transmitted.

After the transmission of the EOS signal, the polling-transmitter also receives SEP/DTC signal, which is not defined in the conventional T-30 protocol. Therefore, a trouble may be generated in the communication.

SUMMARY OF THE INVENTION

In consideration of the foregoing, an object of the present invention is to provide a data communication system capable of effectively executing the multi-polling communication.

DESCRIPTION OF THE PREFERRED EMBODIMENTS

Figure 1:
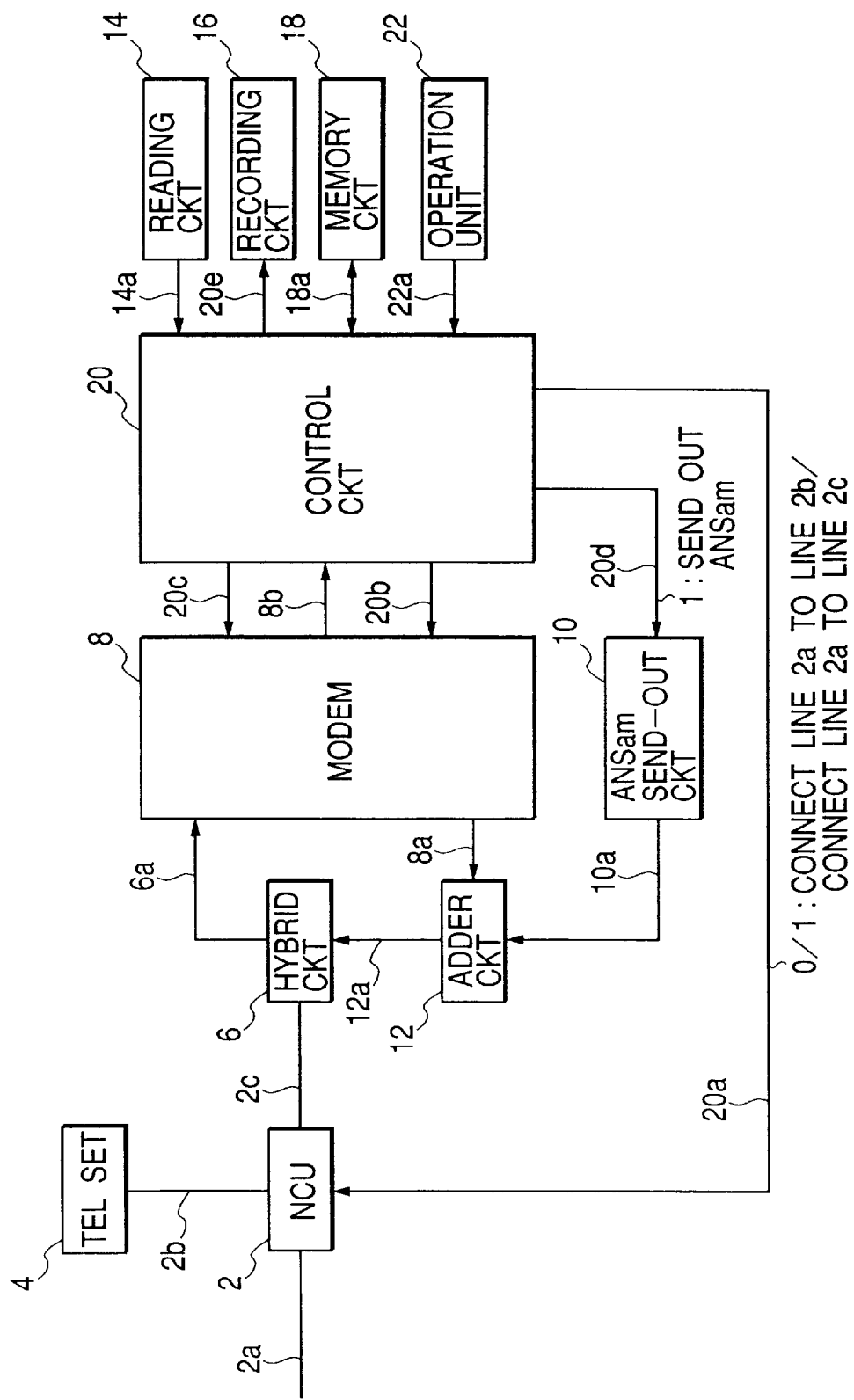
FIG. 1 is a block diagram showing an embodiment of the present invention.

FIG. 1 is a block diagram showing the configuration of a facsimile apparatus embodying the present invention. The facsimile apparatus includes both functions of a polling-transmitter and a polling-receiver.

An NCU (network control unit) 2 is connected to a terminal of a telephone network in order to use such network for data communication or the like to effect connection control of the telephone network for switching control to the data communication line or retaining a loop. The NCU 2 connects a telephone line 2a to a telephone set 4 if the signal level (signal line 20a) from a control circuit 20 is "0", while connects the line to a facsimile apparatus if the signal level is "1". In the normal state, the telephone line 2a is connected to the telephone set 4.

A hybrid circuit 6 separates the signals of a transmission system and those of a reception system, outputs a transmission signal from an adder circuit 12 to the telephone line 2a through the NCU 2, and transfers a signal received from a partner through the NCU 2, to a modem 8 through a signal line 6a.

The modem 8 effects modulation and demodulation based on the ITU-T recommendation V.8, V.21, V.27ter, V.29, V.17 and V.34, and each transmission mode is designated by a signal line 20c. The modem 8 outputs modulated data to a signal line 8a receiving a signal from a signal line 20b, or outputs demodulated data to a signal line 8b receiving a signal from a signal line 6a.

An ANSam signal send-out circuit 10 serves to send an ANSam signal. It outputs the ANSam signal to a signal line 10a when a signal line 20d is of a signal level "1", but it does not output any signal to the signal line 10a when the signal line 20d is of a signal level "0".

An adder circuit 12 receives information on the signal lines 8a and 10a and outputs a result of addition on a signal line 12a. A reading circuit 14 reads an original image and outputs read image data on a signal line 14a. A recording circuit 16 records information outputted on a signal line 20e line by line.

A memory circuit 18 stores unencoded or encoded data obtained by reading an original, or received or decoded information.

An operation unit (or console unit) 22 is provided with a one-touch dial, an abbreviated dial, numeral keys, a * key, a # key, a start key, a sub address signal input key, a set key, a multi-polling reception key and other function keys, and outputs information of a depressed key to a signal line 22a.

A control circuit 20 controls the multi-polling communication in the facsimile apparatus of the present embodiment. In this embodiment, the polling-transmitter at first declares the presence or absence of the multi-polling transmission function by the DIS signal, and the polling-receiver outputs the DTC signal to inform the polling-transmitter whether polling reception of different information is requested in succession to the currently designated information. In response, after the transmission of the document designated by the SEP signal, the polling-transmitter changes the transmitted protocol signal according to whether polling reception of different information is requested by the DTC signal in succession to the currently designated information.

More specifically, after the transmission of the document designated by the SEP signal, the polling-transmitter transmits the EOS signal if the polling reception of different information is requested by the DTC signal in succession to the currently designated information, or the EOP signal if the polling reception of different information is not requested by the DTC signal.

Through these protocols, in response to the EOS signal transmitted by the polling-transmitter, the polling-receiver is capable of transmitting MCF, PPR, and RNR signal in the ECM communication mode or a MCF, RTN or RTP signal in the G3 mode, and it is shifted to the transmission of the DTC signal after 6 seconds from the transmission of the MCF, RTN or RTP signal. Also in case of RNR signal it is shifted to the transmission of the MCF signal after the transmission-reception of RR-RNR signal, and, in case of PPR signal, it is shifted to the transmission of the MCF signal after re-transmission.

Figure 11:
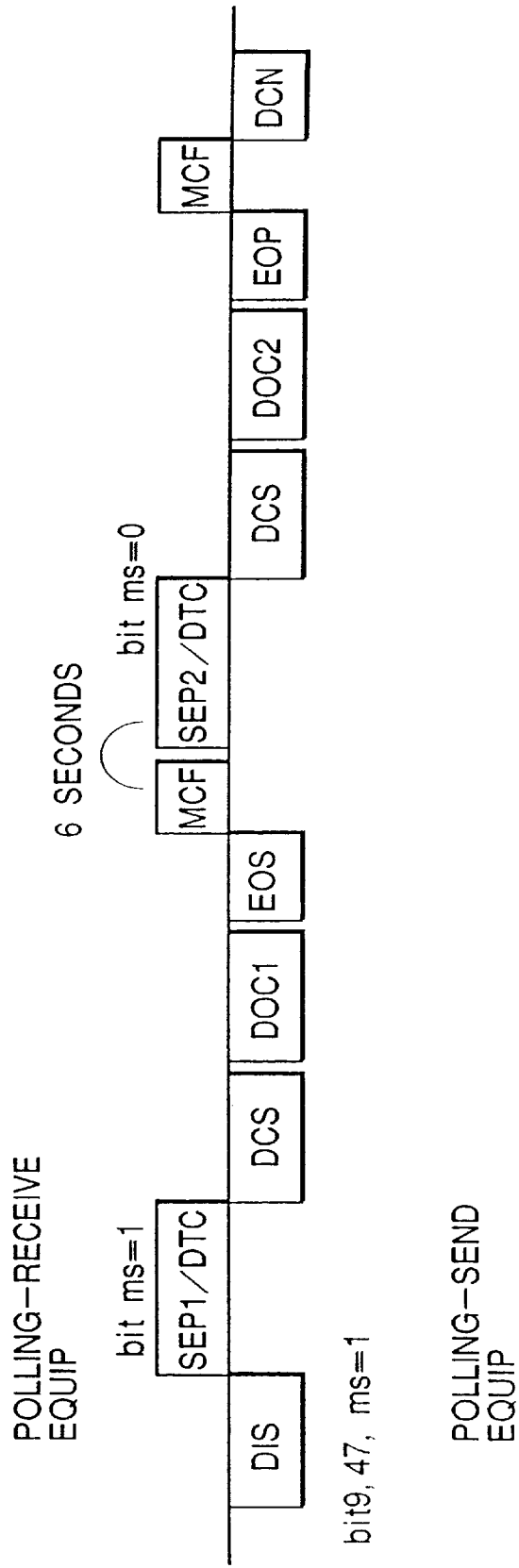
FIG. 11 is a view showing an example of the protocol in the above-mentioned embodiment.
Figure 12:
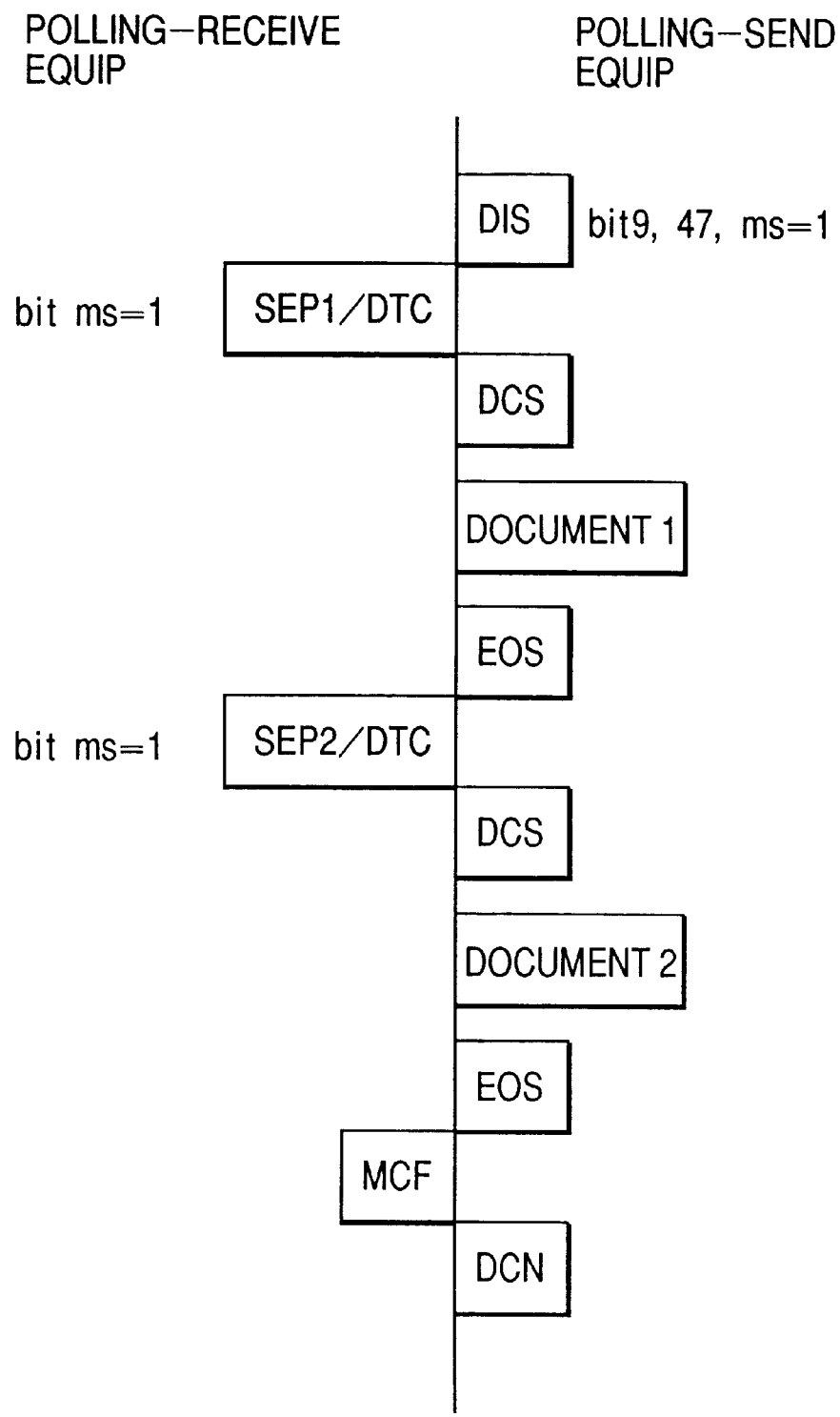
FIG. 12 is a view showing an example of the conventional protocol.

FIG. 11 is a view showing an example of the protocol of multi-polling in the present embodiment.

If there is a request for polling reception of next information in the polling-receiver, the ms bit of the DTC signal is set at "1". After the transmission of a document, the polling-transmitter transmits the EOS signal, and, in response, the polling-receiver can transmit the MCF, RNR, PPR, RTN or RTP signal.

If there is no request for polling reception of next information in the polling-receiver, the ms bit of the DTC signal is set at "0", and, after the transmission of the document, the polling-transmitter transmits the EOP signal and enters an ending process.

A program for controlling the above-described protocol may be stored in advance in a ROM (not shown) provided in the control circuit 20, or may be read into a memory of the facsimile apparatus, by an exclusive reading device (not shown), from an external memory medium such as a floppy disk, a hard disk, a CD-ROM or the like, and analyzed and executed by the control circuit 20.

FIGS. 2 to 10 are flow charts showing the control sequence of the control circuit 20 in the present embodiment.

Figure 2:
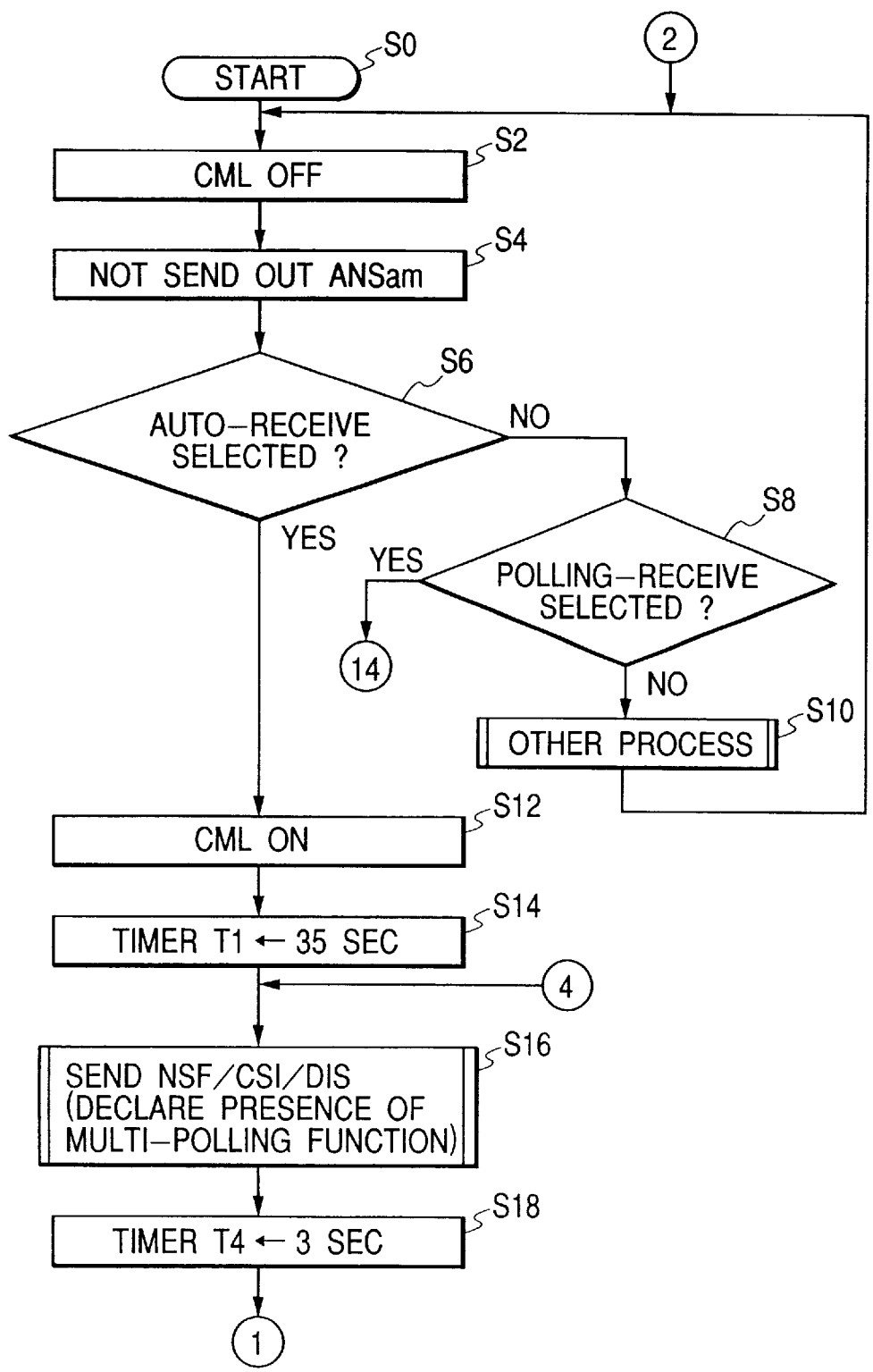
FIGS. 2, 3, 4, 5, 6, 7, 8, 9 and 10 are flow charts showing the functions of the above-mentioned embodiment.
Figure 3:
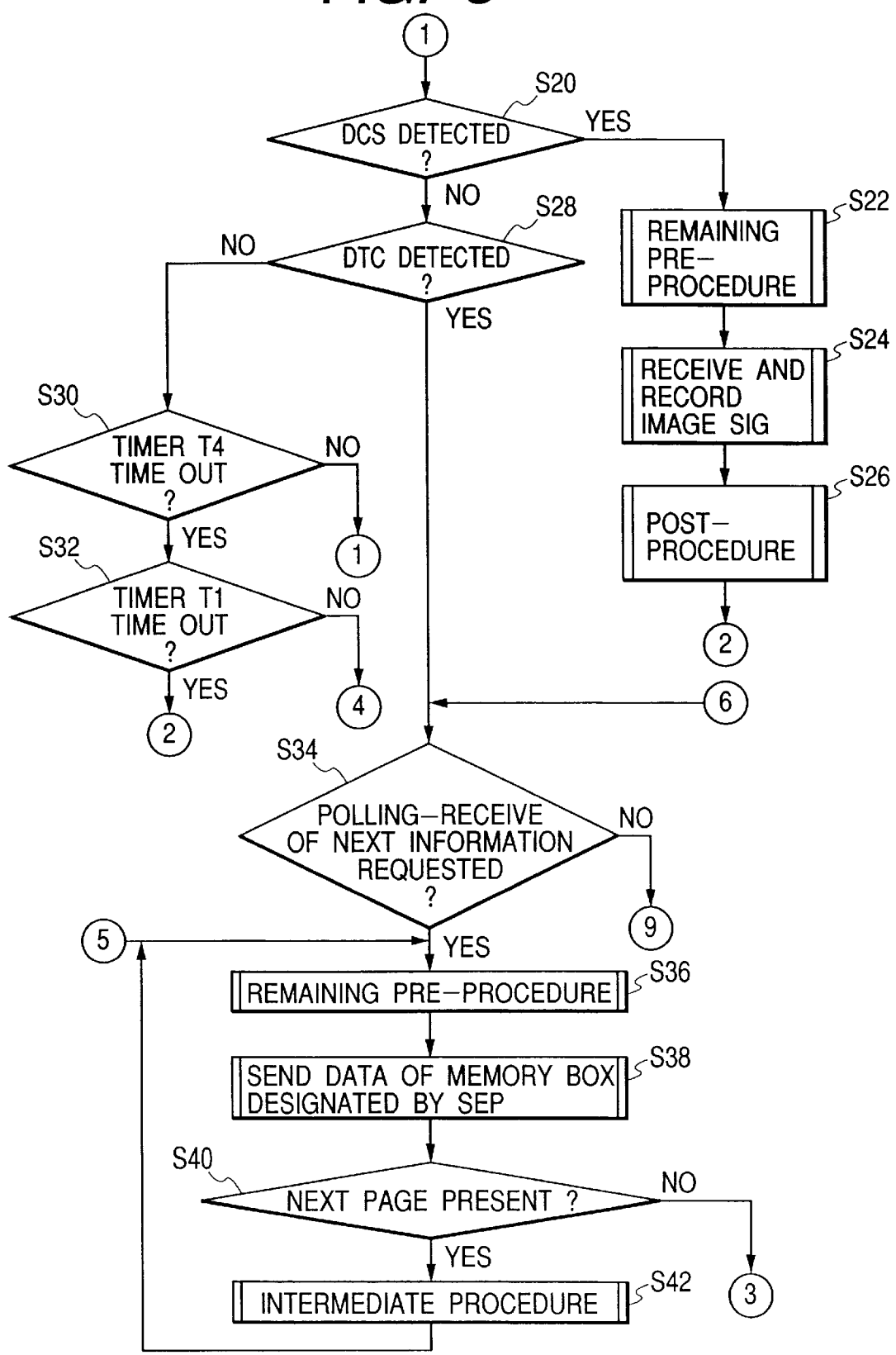
Figure 4:
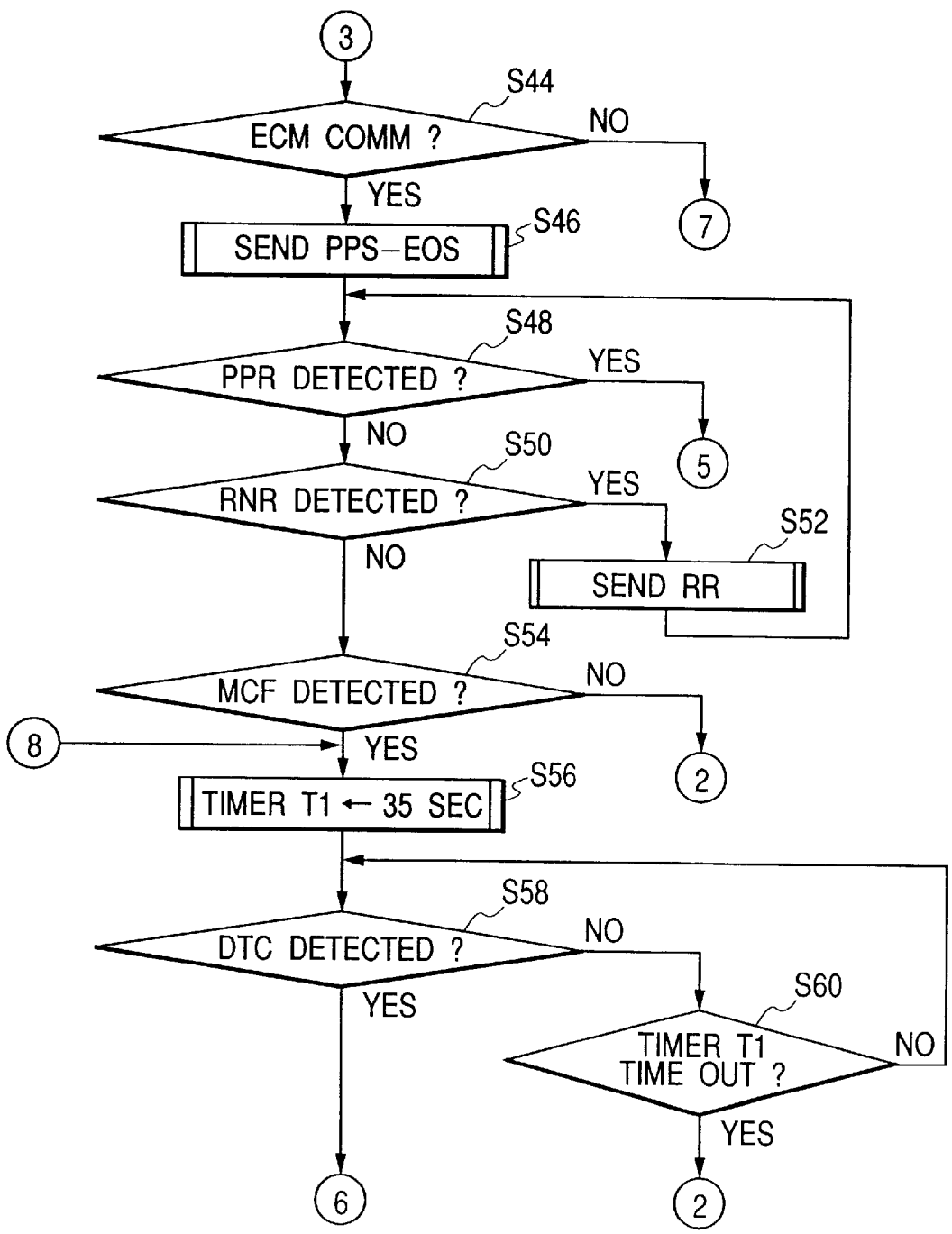
Figure 5:
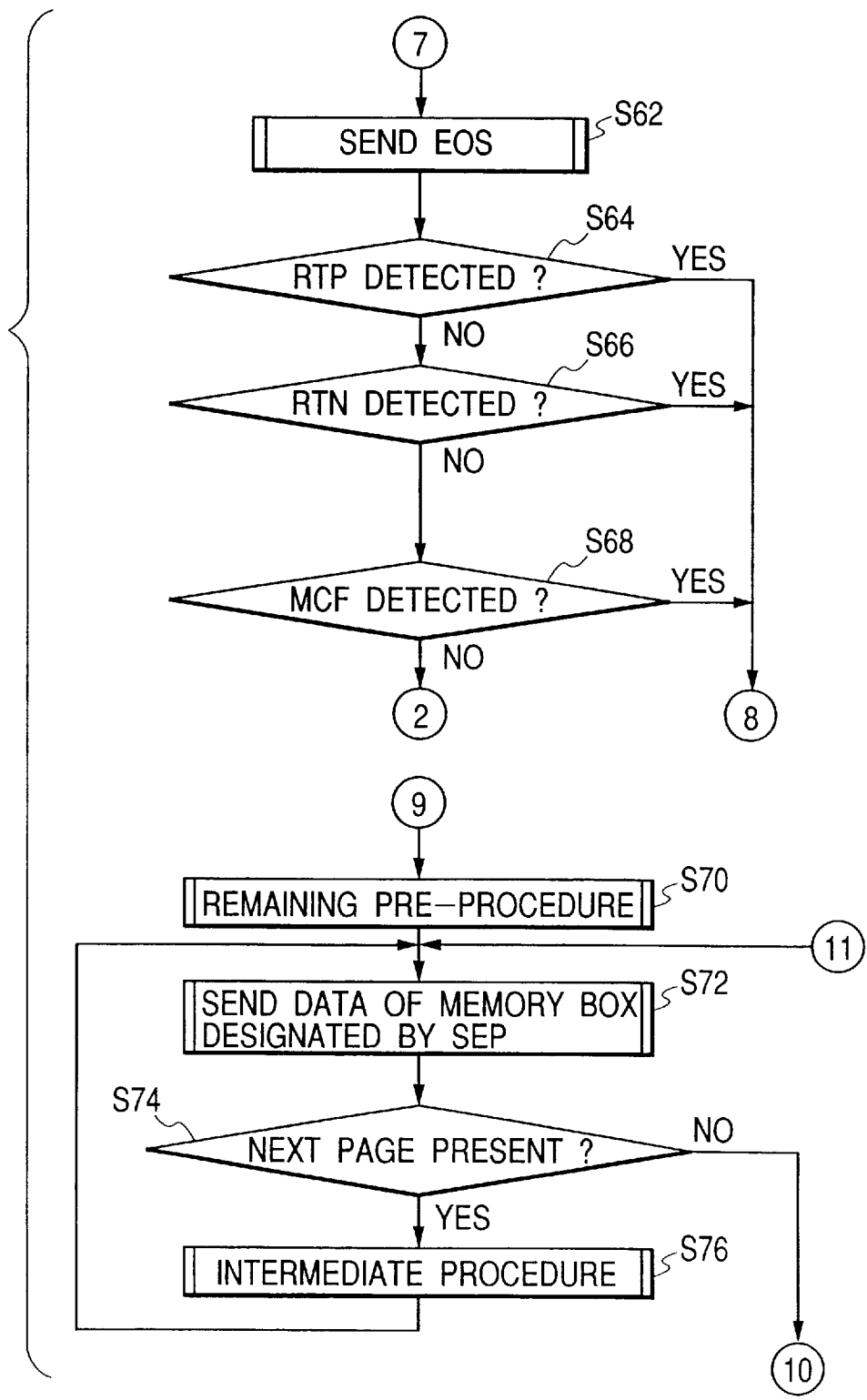
Figure 6:
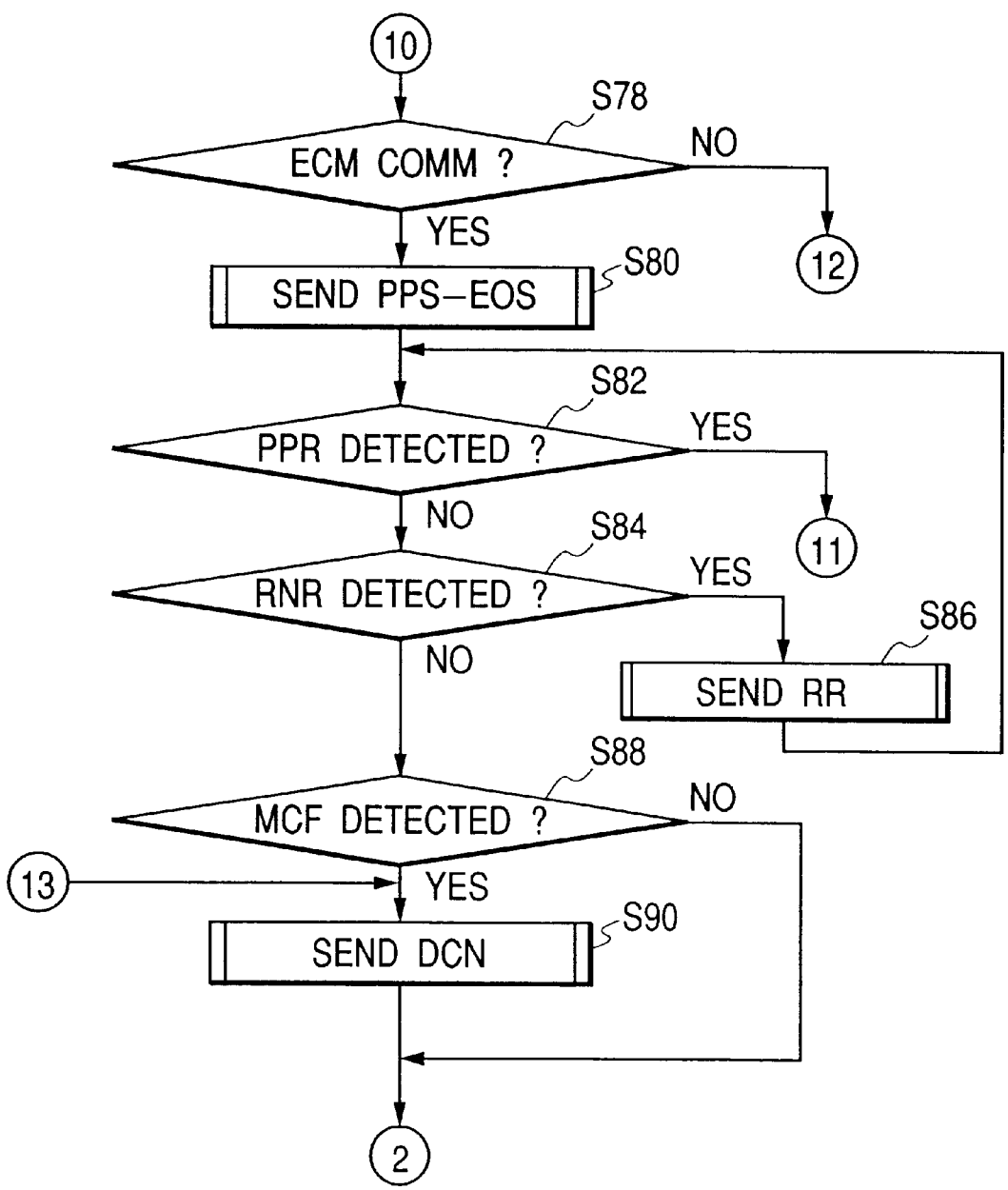
Figure 7:
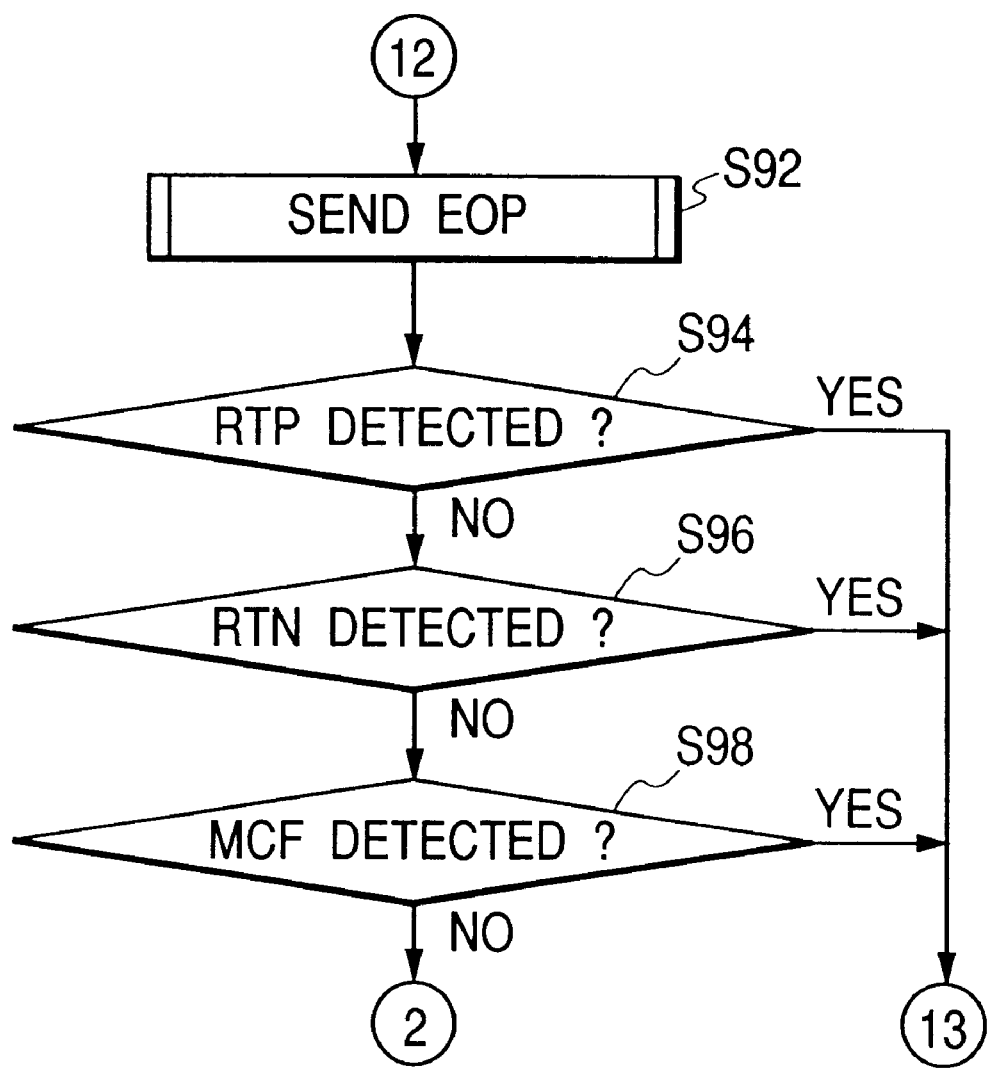
Figure 8:
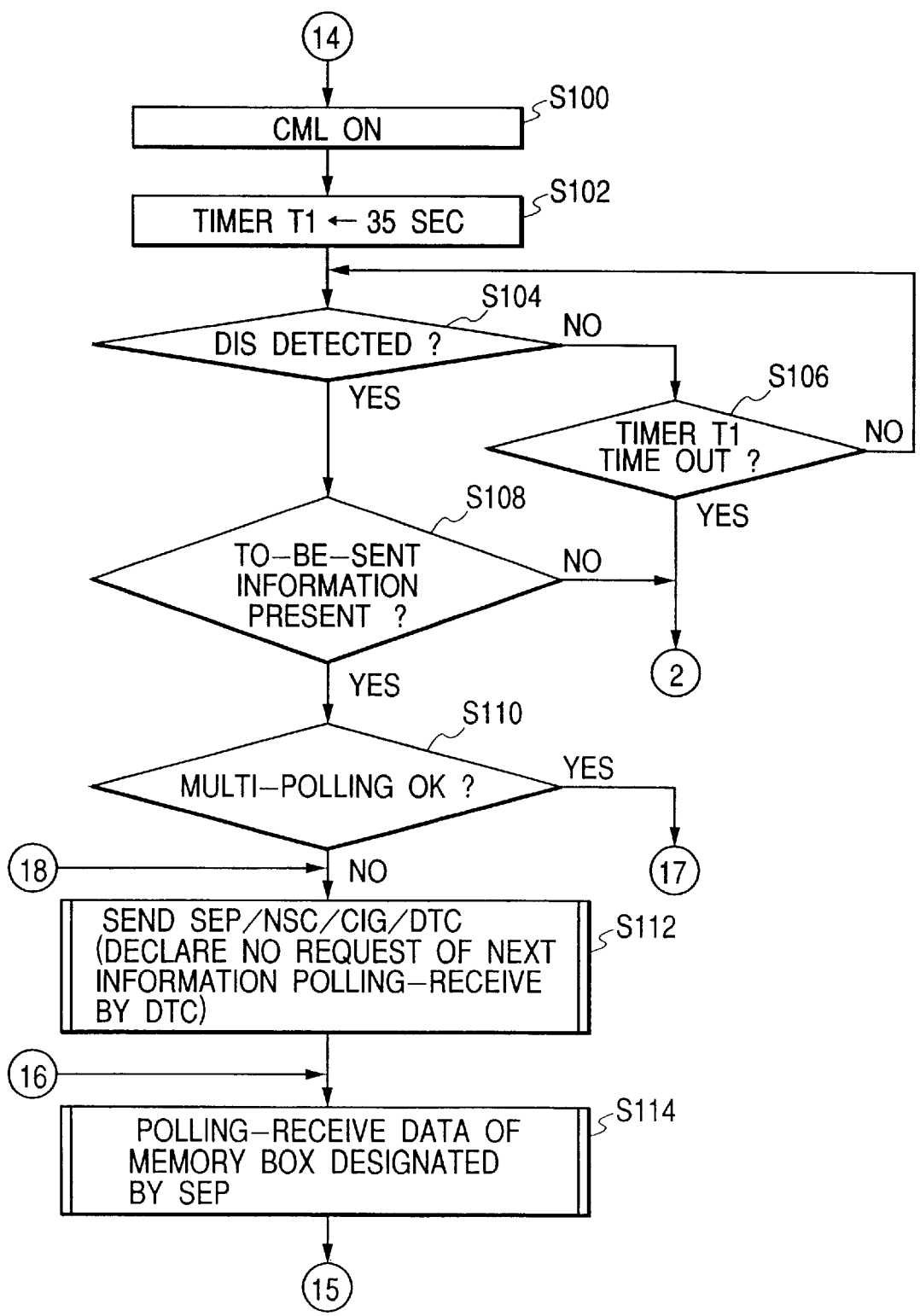
Figure 9:
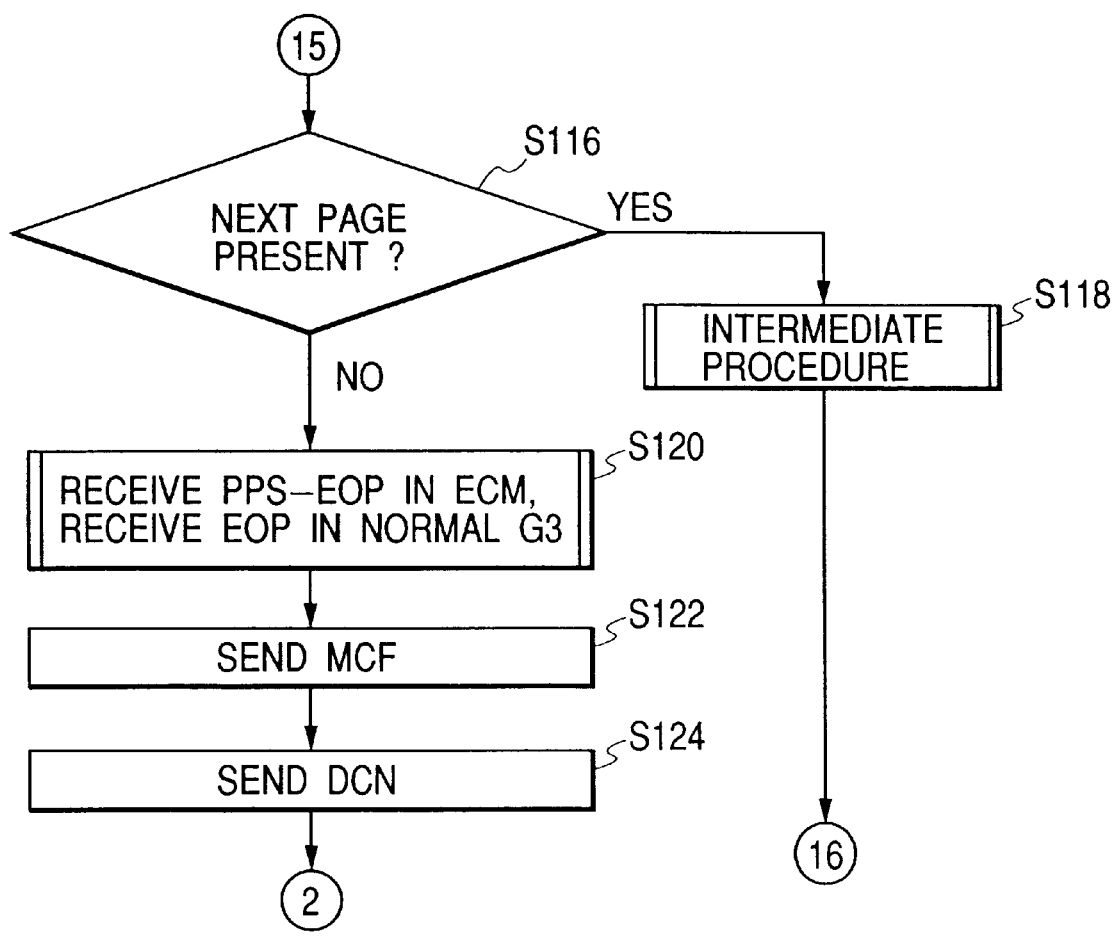
Figure 10:
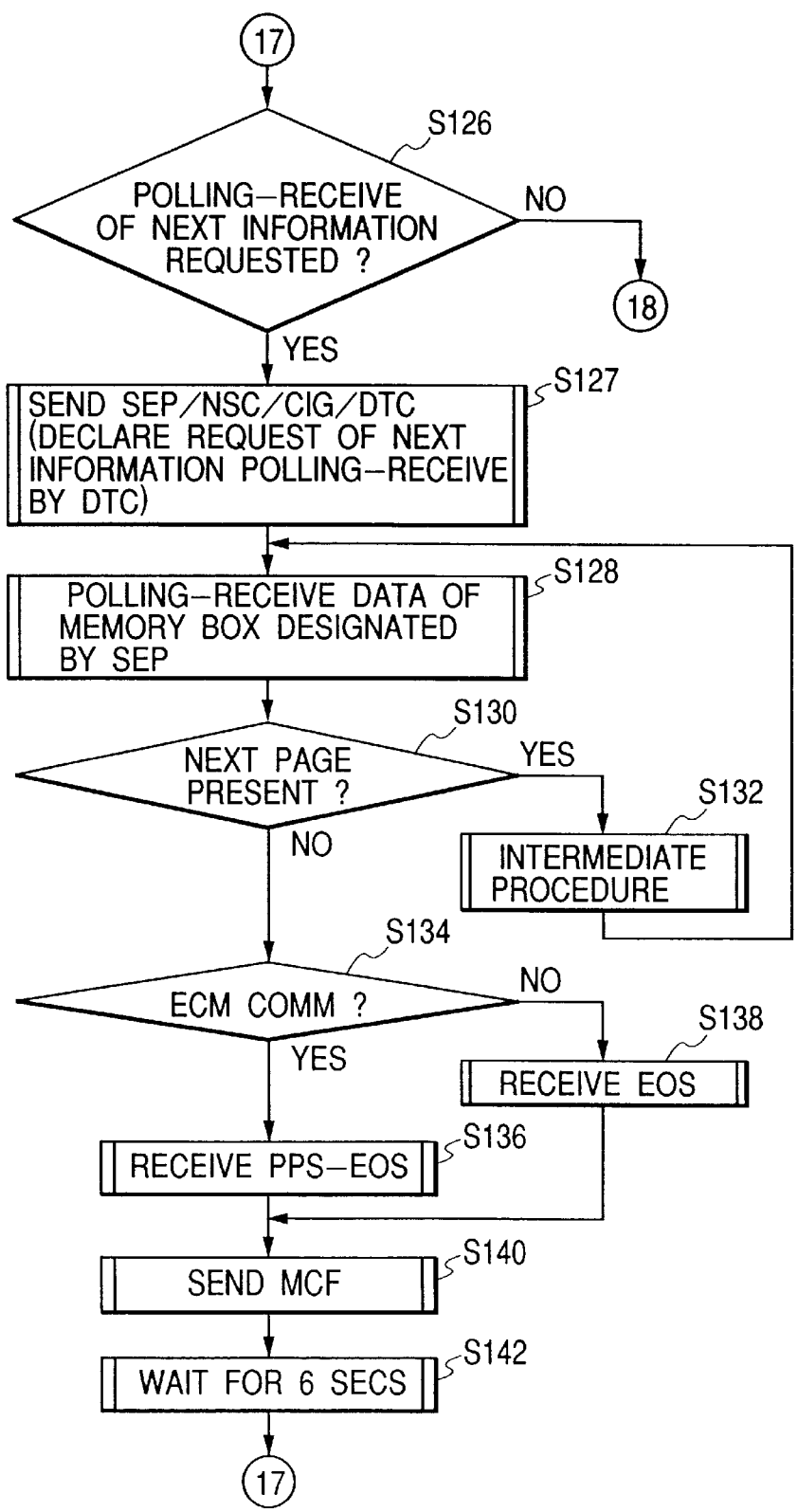

Referring to FIG. 2, a step S0 initiates the sequence, then a step S2 outputs a signal of a level "0" to the signal line 20a to turn off a CML, and a step S4 outputs a signal of a level "0" to the signal line 20d not to transmit the ANSam signal.

A step S6 discriminates whether automatic reception has been selected. If the automatic reception has been selected, the sequence proceeds to a step S12, otherwise it does to a step S8.

The step S8 receives the information of the signal line 22a to discriminate whether the polling reception has been selected, and the sequence proceeds to a step S100 if the polling reception has been selected. If the polling reception has not been selected, the sequence proceeds to a step S10 for executing other processes, and then returns to the step S2.

The step S12 outputs a signal of a level "1" to the signal line 20a to turn on the CML, then a step S14 sets 35 seconds in a timer 1, and a step S16 executes transmission of NSF/CSI/DIS signals. In this state the ms bit of the DIS signal is set at "1" to declare the presence of the multi-polling communication function. Then a step S18 sets 3 seconds in a timer T4.

Then a step S20 discriminates whether the DCS signal has been detected, and, if detected, the sequence proceeds to a step S22 to execute the remaining pre-process. Then a step S24 executes reception/recording of the image signal, then a step S26 executes a post-process and the sequence returns to the step S2.

If the step S20 identifies that the DCS signal has not been detected, the sequence proceeds to a step S28 to discriminate whether the DTC signal has been detected. If the DTC signal has been detected, the sequence proceeds to a step S34, otherwise it does to a step S30.

The step S30 discriminates whether the timer of the timer T4 has expired, and if the time of the timer T4 has expired, the sequence proceeds to a step S32, otherwise it does to the step S20.

The step S32 discriminates whether the time of the timer T1 has expired, and if the time of timer T1 has expired, the sequence proceeds to the step S2, otherwise it does to a step S16.

The step S34 discriminates whether the ms bit of the DTC signal is "1", namely whether there is a request for polling reception for the next information, and, if not, the sequence proceeds to a step S70. If affirmative, the sequence proceeds to a step S36 to execute the remaining pre-process. Then a step S38 executes transmission of the information stored in a memory box designated by the SEP signal.

Then a step S40 discriminates whether a next page is present in the memory box, and, if present, the sequence proceeds to a step S42 to execute an inter-process and then to the step S38.

If the step S40 identifies the absence of the next page, the sequence proceeds to a step S44 to discriminates whether the ECM communication has been selected. If the ECM communication has been selected, the sequence proceeds to a step S46, but if a normal G3 communication has been selected, it does to a step S62.

The step S46 transmits a PPS-EOS signal and receives a response. Then a step S48 discriminates whether the PPR signal has been detected. If the PPR signal has been detected, the sequence proceeds to the step S36, otherwise it does to a step S50.

A step S50 discriminates whether the RNR signal has been detected, and, if detected, the sequence proceeds to a step S52 for receiving the RR signal and then to the step S48. If the RNR signal is not detected, the sequence proceeds to a step S54 to discriminate whether the MCF signal has been detected. If the MCF signal has not been detected, the sequence proceeds to the step S2.

If the step S54 identifies detection of the MCF signal, the sequence proceeds to a step S56 to set 35 seconds in the timer T1, and steps S58, S60 discriminate whether the DT signal has been detected prior to the expiration of the timer T1. If detected, the sequence proceeds to the step S34, but, in case of expiration of the timer T1, the sequence proceeds to the step S2.

The step S62 transmits the EOS signal and receives a response thereto. Steps S64, S66, S68 respectively discriminate, in succession, whether the RTP, RTN and MCF signals have been received. If any of these signals is not detected, the sequence proceeds to the step S56, but if none of these signals has been detected, it does to the step S2.

A step S70 executes the remaining pre-process, and a step S72 executes transmission of the information stored in a memory box designated by the SEP signal. A step S74 discriminates whether a next page is present in this memory box. If present, the sequence proceeds to a step S76 to execute the intermediate process and then to the step S72, but if absent, it does to a step S78.

The step S78 discriminates whether the ECM communication has been designated. If the ECM communication has been designated, the sequence proceeds to a step S80 but if the normal G3 communication has been designated, it does to a step S92.

The step S80 transmits a PPS-EOS signal and receives a response. Then a step S82 discriminates whether the PPR signal has been detected. If the PPR signal has been detected, the sequence proceeds to the step S72, otherwise it does to a step S84.

The step S84 discriminates whether the RNR signal has been detected. If detected, the sequence proceeds to the step S84 for transmitting the RNR signal and then to the step S82, otherwise it does to a step S88.

A step S88 discriminates whether the MCF signal has been detected. If detected, the sequence proceeds to a step S90 for transmitting the DCN signal and then to the step S2, otherwise it does to the step S2.

The step S92 transmits the EOP signal and receives a response thereto. Steps S94, S96, S98 respectively discriminate, in succession, whether the RTP, RTN and MCF signals have been received. If any of these signals has been detected, the sequence proceeds to the step S56, but if none of these signals has been detected, it does to the step S2.

A step S100 outputs a signal of a level "1" to the signal line 20a to turn on the CML, and a step S102 sets 35 seconds in the timer T1.

Steps S104, S106 discriminate whether the DIS signal has been detected within the time of the timer T1. If detected, the sequence proceeds to a step S108 but if the time of the timer T1 has expired, it does to the step S2.

The step S108 discriminates, based on the DIS signal, whether transmission information is present in the partner equipment. If the transmission information is present, the sequence proceeds to a step S110, otherwise it does to the step S2.

The step S110 discriminates, based on the DIS signal, whether the partner equipment has the multi-polling communication function, namely whether the ms bit of the received DIS signal is "1". If affirmative, the sequence proceeds to a step S126, but if negative, it does to a step S112.

The step S112 executes transmission of SEP/NSC/CIG/DTC signals. In this state the ms bit of the DTS signal is set at "0" to declare the absence of request for the polling reception of the next information.

A step S114 executes polling reception of the information stored in a memory box designated by the SEP signal. Then a step S116 discriminates whether a next page is present. If present, the sequence proceeds to a step S118 to execute an intermediate process and then to the step S38, but, if absent, the sequence proceeds to a step S120.

The step S120 executes reception of the PPS-EOP signal in case of the ECM communication, or reception of the EOP signal in case of the normal G3 communication. Then a step S122 executes transmission of the MCF signal, and a step S124 executes successive reception of the DCN signal.

The step S126 discriminates whether the polling reception of the next information is to be requested. If affirmative, the sequence proceeds to a step S127, but if negative, it does to the step S112.

The step S127 executes transmission of the SEP/NSC/CIG/DTC signals. In this state the ms bit of the DTC signal is set at "1" to declare the presence of request for the polling reception of the next information. Then a step S128 executes polling reception of the information stored in the memory box designated by the SEP signal.

Then a step S130 discriminates whether a next page is present in the memory box, and, if present, the sequence proceeds to a step S132 to execute an inter-process and then to a step S134.

The step S134 discriminates whether the ECM communication has been designated. If the ECM communication has been designated, the sequence proceeds to a step S136 for receiving the PPS-EOS signal, but if the normal G3 communication has been designated, it does to a step S138 for receiving the EOS signal.

Thereafter a step S140 executes transmission of the MCF signal, a step S142 executes waiting for 6 seconds, and the sequence proceeds to the step S126.

The foregoing embodiment has been explained by a facsimile apparatus of stand-alone type, but the present invention is not limited to such embodiment and is naturally applicable also to the data communication control in a comprehensive data processing system in which a copying function, an electronic filing function, a data processing function etc. are combined with communicating function. Also a similar procedure is applicable not only to the image transmission but also to other data communication.

As explained in the foregoing, even in case of requesting the multi-polling, the present embodiment allows to inform, from the polling-receiver to the polling-transmitter, whether preceding polled information has correctly been received, and also allows communication of the RTN, RTP, RNR and PPR signals thereby ensuring the communication.

It is also rendered possible to inform, from the polling-receiver to the polling-transmitter, whether the polling reception of different information is requested in succession to the designated information, and the polling-transmitter changes the control according to such information, thereby securing the communication and improving the convenience thereof.

What is claimed is:

1. A data communication system that performs multi-polling communication, comprising:

a polling-transmitter; and a polling-receiver, wherein said polling-transmitter declares a presence or an absence of a multi-polling transmission function by a DIS signal, wherein said polling-receiver informs, by a DTC signal, whether it requests polling reception of different information in succession to designated information, and wherein said polling-transmitter is adapted to, after the transmission of a document designated by a SEP signal, change a protocol signal to be transmitted, according to whether polling reception of different information is requested by the DTC signal.

2. A data communication system according to claim 1, wherein said polling-transmitter is adapted to, after the transmission of a document designated by the SEP signal, transmit an EOS signal, in a case in which the DTC signal requests the polling reception of different information in succession to the designated information, or transmit an EOP signal, in a case in which the DTC signal does not request the polling reception of different information.

3. A data communication system according to claim 1, wherein said polling-receiver, in response to an EOS signal transmitted by said polling-transmitter, transmits MCF, PPR, and RNR signals in an ECM communication mode, or transmits MCF, RTN, and RTP signals in a G3 communication mode, and, after a lapse of 6 seconds from transmission of a MCF, RTN, or RTP signal, shifts to transmission of a DTC signal.

4. A data communication system according to claim 2, wherein said polling-receiver, in response to the EOS signal transmitted by said polling-transmitter, transmits MCF, PPR, and RNR signals in an ECM communication mode, or transmits MCF, RTN, and RTP signals in a G3 communication mode, and, after a lapse of 6 seconds from transmission of a MCF, RTN, or RTP signal, shifts to transmission of a DTC signal.

5. A polling reception method for multi-polling reception, comprising the step of:

after declaring a presence or an absence of a multi-polling communication function by a DIS signal from a polling-transmitter, informing, by a DTC signal, whether polling reception of different information in succession to designated information is requested.

6. A polling transmission method for multi-polling transmission, comprising the steps of:
declaring a presence or an absence of a multi-polling communication function by a DIS signal;
discriminating, by a DTC signal from a polling-receiver, whether polling reception of different information in succession to designated information is requested; and
after transmission of a document designated by a SEP signal, changing a protocol signal to be transmitted, according to a result of said discriminating step.

7. A polling transmission method for multi-polling communication between a polling-transmitter and a polling-receiver, comprising the steps of:
the polling-transmitter declaring a presence or an absence of a multi-polling communication function by a DIS signal;
the polling-receiver informing, by a DTC signal, whether polling reception of different information in succession to designated information is requested; and
the polling-transmitter, after transmission of a document designated by a SEP signal, changing a protocol signal to be transmitted, according to whether polling reception of different information is requested by the DTC signal.

8. A memory medium storing a computer-readable program for executing data communication method of multi-polling communication between a polling-transmitter and a polling-receiver, the program comprising:
code for a step in which the polling-transmitter declares a presence or an absence of a multi-polling communication function by a DIS signal;
code for a step in which the polling-receiver informs, by a DTC signal, whether polling reception of different information in succession to designated information is requested; and
code for a step in which the polling-transmitter, after transmission of a document designated by a SEP signal, changes a protocol signal to be transmitted, according to whether polling reception of different information is requested by the DTC signal.

9. A polling reception apparatus for multi-polling reception, comprising:
informing means for informing, by a DTC signal, whether polling reception of different information in succession to designated information is requested, after declaration of a presence or an absence of a multi-polling communication function in a DIS signal is received from a partner station.

10. A polling reception apparatus for multi-polling reception, comprising:
multi-polling communication function deciding means for deciding a presence or an absence of a multi-polling communication function, based on a signal from a partner station; and
informing means for informing whether polling reception of different information in succession to designated information is requested,
wherein, in a case in which polling reception of different information in succession to designated information is requested, when it is decided that the partner station has the multi-polling communication function, based on a decision result of said multi-polling communication function deciding means, said informing means informs that polling reception of different information in succession to designated information is requested.

11. A polling transmission apparatus for multi-polling transmission, comprising:
declaring means for declaring a presence or an absence of a multi-polling communication function by a DIS signal;
discriminating means for discriminating, by a DTC signal from a polling-receiver, whether polling reception of different information in succession to designated information is requested; and
transmitting means for transmitting a document designated by a SEP signal,
wherein said transmitting means changes a protocol signal to be transmitted, based on a discrimination result of said discrimination means, after transmission of the document designated by the SEP signal.

12. A polling transmission apparatus for multi-polling transmission, comprising:
declaring means for declaring a presence or an absence of a multi-polling communication function to a partner station;
discriminating means for discriminating, through a polling receiver, whether polling reception of different information in succession to designated information is requested;
transmitting means for transmitting a document designated by the partner station; and
notifying means for notifying, by a protocol signal, that the document designated by the partner station has been transmitted,
wherein said notifying means changes the protocol signal, according to a discrimination result of said discrimination means.

13. A computer program product embodying a program for implementing a communication of a polling reception apparatus adapted to perform multi-polling reception, said program product comprising:
program code for informing, by a DTC signal, whether polling reception of different information in succession to designated information is requested, after declaration of a presence or an absence of a multi-polling communication function in a DIS signal is received from a partner station.

14. A computer program product embodying a program for implementing a communication method of a polling reception apparatus adapted to perform multi-polling reception, said program comprising:
program code for a decision step of deciding a presence or an absence of a multi-polling communication function, based on a signal from a partner station; and
program code for a notification step of informing whether polling reception of different information in succession to designated information is requested,
wherein, in a case in which polling reception of different information in succession to designated information is requested, when it is decided that the partner station has the multi-polling communication function, based on a decision result in the decision step, the notification step informs that polling reception of different information in succession to designated information is requested.

15. A computer program program product embodying a program for implementing a communication method of a polling transmission apparatus adapted to perform multi-polling transmission, the program comprising:

program code for a declaration step of declaring a presence or an absence of a multi-polling communication function by a DIS signal;

program code for a discrimination step of discriminating, by a DTC signal from a polling-receiver, whether polling reception of different information in succession to designated information is requested; and program code for a tramsmission step of transmitting a document designated by a SEP signal, wherein a protocol signal to be transmitted is changed, based on a discrimination result in the discrimination step, after transmission of the document designated by the SEP signal.

16. A computer program product embodying a program for implementing a communication method of a polling transmission apparatus adapted to perform multi-polling transmission, the program comprising:

program code for a declaration step of declaring a presence or an absence of a multi-polling communication function to a partner station;

program code for a discrimination step of discriminating, through a polling receiver, whether polling reception of different information in succession to designated information is requested;

program code for a transmission step of transmitting a document designated by the partner station; and program code for a notification step of notifying, by a protocol signal, that the document designated by the partner station has been transmitted, wherein the notification step changes the protocol signal, according to a discrimination result of the discrimination step.

17. A communication method of a polling reception apparatus adapted to perform multi-polling reception, comprising the steps of:

deciding a presence or an absence of a multi-polling communication function, based on a signal from a partner station; and informing whether polling reception of different information in succession to designated information is requested, wherein, in a case in which polling reception of different information in succession to designated information is requested, when it is decided that the partner station has the multi-polling communication function, based on a decision result of said deciding step, said informing step informs that polling reception of different information in succession to designated information is requested.

18. A communication method polling transmission apparatus adapted to perform multi-polling transmission, comprising the steps of:

declaring a presence or an absence of a multi-polling communication function to a partner station;

discriminating whether polling reception of different information in succession to designated information is requested;

transmitting a document designated by the partner station; and notifying, by a protocol signal, that the document designated by the partner station has been transmitted, wherein the protocol signal is changed in said notifying step, according to a discrimination result in said discriminating step.

* * * * *

UNITED STATES PATENT AND TRADEMARK OFFICE
CERTIFICATE OF CORRECTION

PATENT NO.    : 6,546,020 B1
DATED         : April 8, 2003
INVENTOR(S)   : Takehiro Yoshida It is certified that error appears in the above-identified patent and that said Letters Patent is hereby corrected as shown below:

Column 2,
Line 1, "connects" should read -- it connects --.

Column 3,
Line 41, "timer 1," should read -- timer T1, --.
Line 57, "timer" (first occurrence) should read -- time --.

Column 4,
Line 11, "discriminates" should read -- discriminate --.
Line 61, "S84" should read -- S86 --.

Column 5,
Line 34, "step S38," should read -- S114, --.

Column 9,
Line 8, "tramsmission" should read -- transmission --.

Signed and Sealed this

Fourteenth Day of October, 2003

JAMES E. ROGAN
*Director of the United States Patent and Trademark Office*